Patented Aug. 19, 1952

2,607,795

UNITED STATES PATENT OFFICE 2,607,795

INHIBITION OF POLYMERIZATION OF ACRYLONITRILE

Carlyle J. Stehman, Dayton, Ohio, assignor to Monsanto Chemical Company, St. Louis, Mo., a corporation of Delaware No Drawing. Application May 14, 1951, Serial No. 226,277

4 Claims. (Cl. 260—465.9)

This invention relates to a method for inhibiting the polymerization of acrylonitrile. An object of this invention is to prevent the autopolymerization of acrylonitrile in storage at ordinary temperatures and also under conditions of elevated temperature, such as those encountered during distillation of acrylonitrile. It is also an object to overcome certain disadvantages such as the dark color imparted by inhibitors previously used. A compound suitable for this purpose should inhibit the polymerization of monomeric acrylonitrile in the absence of polymerization catalysts during storage but should not inhibit polymerization during the catalyzed polymerization of acrylonitrile when it is desired to prepare polymeric compositions.

I have discovered that alpha-naphthylamine will inhibit the polymerization of acrylonitrile without the formation of a prominent color in the inhibited solution. It is thus an advantage of this compound that acrylonitrile may be stored for long periods of time even under adverse conditions, such as in the presence of oxygen without solidifying or polymerizing. It has also been found that alpha-naphthylamine does not adversely affect the polymerization of acrylonitrile in the presence of peroxide type catalysts which are conventionally employed in the polymerization of acrylonitrile when it is desired to prepare polymers and copolymers of acrylonitrile.

It has been found that the alpha-naphthylamine dissolves readily in inhibitory concentrations in the acrylonitrile. It has been found that concentrations of the order of 0.5 to 1000 parts per million (p. p. m.) are effective for the inhibition of polymerization. A preferred range of concentrations is from 2 to 50 parts per million.

The alpha-naphthylamine may be subjected to elevated temperatures such as those encountered in tropical storage or during distillation of the monomeric acrylonitrile, and effectively inhibit the polymerization of the monomeric material. The inhibitor may be removed from the acrylonitrile when desired by a distillation step or by extraction with a suitable solvent such as a hydrocarbon. It is also contemplated that this inhibitor may be introduced into a distilling column in which the acrylonitrile is being distilled in order to prevent the high temperature polymerization of acrylonitrile. This inhibitor may be introduced into the upper portion of the column so that it will be effective throughout the column. It is an advantage of the alpha-naphthylamine that it has a negligible color effect particularly in the above concentrations so that the color of the acrylonitrile both in monomeric and in polymeric form is not seriously affected by the presence of the inhibitor. It is another advantage of this inhibitor that the compound is a relatively low cost chemical so that it may be employed to prevent the polymerization of monomeric acrylonitrile without greatly adding to the cost thereof.

In order to show the effectiveness of this inhibitor in comparison with other known inhibitors a test was carried out in which acrylonitrile containing the inhibitor to be compared was subjected to the oxygen bomb test, which is conventionally employed for determining the stability of gasoline in the presence of oxygen at high pressures. This test is carried out as follows:

Using a graduated cylinder, measure 25 ml. of acrylonitrile containing the inhibitor into the glass liner. Place the liner in the stainless steel bomb connected to a pressure recording gauge and close the bomb tightly. Add oxygen to a pressure of 100 pounds per square inch at room temperature. Place the bomb in a steam bath and note the pressure characteristics over a four-hour period.

As the bomb becomes heated, the pressure will rise gradually to about 140 pounds per square inch. If the sample is potentially unstable, the pressure, after leveling off, will drop, then increase rapidly, and the acrylonitrile will become a yellow solid polymer. If no sudden pressure drop is noted, and if no solid polymer is formed during the test period, the sample is considered to be stable.

The above tests were conducted utilizing the following inhibitors:

Tertiary butyl catechol
Beta-naphthylamine
Alpha-naphthylamine as shown in the table below in which the concentrations as well as the effect upon the acrylonitrile are shown.

*Comparison of inhibitors*

| Inhibitor | Conc. | Time | Result |
|---|---|---|---|
| | p. p. m. | | |
| Tert.-butyl catechol | 100 | 4 hr. 40 min | Sample solidified. |
| Beta-naphthylamine | 100 | do | Do. |
| Alpha-naphthylamine | 100 | do | No polymer present. |
| Beta-naphthylamine | 10 | 4 hr | Sample solidified. |
| Alpha-naphthylamine | 10 | do | No polymer present. |

The above data show that the alpha-naphthylamine is effective at lower concentrations than the conventional inhibitors of the prior art. In addition to the above accelerated stability test carried out in the presence of oxygen at elevated temperatures and high pressures it has been found that the present inhibitor is effective in prolonged storage under normal atmospheric conditions. Over extended periods the acrylonitrile inhibited with alpha-naphthylamine shows a freedom of solid matter (i. e., polymer) and discoloration.

What I claim is:

1. The method of inhibiting the polymerization of acrylonitrile which comprises incorporating therewith from about 0.5 to 1000 parts per million of alpha-naphthylamine.

2. The method of inhibiting the polymerization of acrylonitrile which comprises incorporating therewith from about 2 to 50 parts per million of alpha-naphthylamine.

3. As a composition of matter acrylonitrile containing from 0.5 to 1000 parts per million of alpha-naphthylamine dissolved therein.

4. As a composition of matter acrylonitrile containing from 2 to 50 parts per million of alpha-naphthylamine dissolved therein.

CARLYLE J. STEHMAN.

REFERENCES CITED

The following references are of record in the file of this patent:

UNITED STATES PATENTS

| Number | Name | Date |
| --- | --- | --- |
| 2,152,685 | Nicodemus et al. | Aug. 2, 1938 |
| 2,301,131 | Lichty | Nov. 3, 1942 |
| 2,375,015 | Marple et al. | May 1, 1945 |

OTHER REFERENCES

Ducommum: Chem. Abst., vol. 43, p. 4455 (1949).